(12) United States Patent
El Hamss et al.

(10) Patent No.: US 12,081,342 B2
(45) Date of Patent: Sep. 3, 2024

(54) HARQ-ACK CODEBOOK ADAPTATION

(71) Applicant: InterDigital Patent Holdings, Inc., Wilmington, DE (US)

(72) Inventors: Aata El Hamss, Laval (CA); Shahrokh Nayeb Nazar, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 393 days.

(21) Appl. No.: 17/429,613

(22) PCT Filed: Feb. 12, 2020

(86) PCT No.: PCT/US2020/017881
§ 371 (c)(1),
(2) Date: Aug. 9, 2021

(87) PCT Pub. No.: WO2020/167914
PCT Pub. Date: Aug. 20, 2020

(65) Prior Publication Data
US 2022/0407631 A1    Dec. 22, 2022

Related U.S. Application Data

(60) Provisional application No. 62/805,023, filed on Feb. 13, 2019.

(51) Int. Cl.
*H04L 1/1829* (2023.01)
*H04L 1/1812* (2023.01)
*H04L 5/00* (2006.01)

(52) U.S. Cl.
CPC .......... *H04L 1/1854* (2013.01); *H04L 1/1861* (2013.01); *H04L 5/0055* (2013.01); *H04L 1/1812* (2013.01)

(58) Field of Classification Search
CPC .... H04L 1/1854; H04L 1/1861; H04L 5/0055
See application file for complete search history.

(56) References Cited

U.S. PATENT DOCUMENTS

| 2015/0003346 A1 | 1/2015 | Kim et al. |
| 2018/0279291 A1 | 9/2018 | Tiirola et al. |

(Continued)

FOREIGN PATENT DOCUMENTS

| JP | 2011530253 A | 12/2011 |
| WO | 2010015429 A1 | 2/2010 |

(Continued)

OTHER PUBLICATIONS

3rd Generation Partnership Project (3GPP), R1-1900350, "UCI Enhancements for NR URLLC", NEC, 3GPP TSG RAN WG1 Meeting Adhoc#1901, Taipei, Taiwan, Jan. 21-25, 2019, 5 pages.

(Continued)

*Primary Examiner* — Ronald B Abelson
(74) *Attorney, Agent, or Firm* — Condo Roccia Koptiw LLP

(57) ABSTRACT

Systems, methods, and instrumentalities are disclosed that may be associated with HARQ-ACK codebook adaptations. A WTRU) may be configured with multiple physical uplink channels, e.g., physical uplink control channels (PUCCHs), in a slot. Each physical uplink channel may have a respective HARQ-ACK codebook. In examples, the WTRU may determine that a first physical uplink channel and a second physical uplink channel overlap in a slot. In such a case, the WTRU may determine that a first HARQ-ACK codebook associated with the first physical uplink channel has a higher priority than a second HARQ-ACK codebook associated with the second physical uplink channel. The WTRU may transmit the first HARQ-ACK codebook on the first physical uplink channel in the slot. The WTRU may send part of the second HARQ-ACK codebook in the slot and part of the (Continued)

second HARQ-ACK codebook in a subsequent slot (e.g., a next slot, a future slot, etc.).

15 Claims, 11 Drawing Sheets

(56) References Cited

U.S. PATENT DOCUMENTS

2018/0324787 A1    11/2018  Yin et al.
2021/0391956 A1*   12/2021  Gou .................... H04W 72/56

FOREIGN PATENT DOCUMENTS

| WO | 2013036090 A1 | 3/2013 |
| WO | 2015013072 A1 | 1/2015 |
| WO | 2018/204730 A1 | 11/2018 |

OTHER PUBLICATIONS

3rd Generation Partnership Project (3GPP), R1-1901151, "Enhanced HARQ-ACK for NR URLLC", Fraunhofer HHI, Fraunhofer IIS, 3GPP TSG RAN WG1 Meeting AH-1901, Taipei, Taiwan, Jan. 21-25, 2018, 3 pages.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.

R1-1800453, , "Corrections on HARQ Feedback", 3GPP TSG RAN WG1 #AH 1801; Samsung; Vancouver, Canada, Jan. 22-26, 2018, 9 pages.

R1-1910222, , "UCI Enhancements for URLLC", 3GPP TSG RAN WG1 #98bis Chongqing, China, Oct. 14-20, 2019, 13 pages.

* cited by examiner

PUCCH$_1$ carrying HARQ-ACK codebook 1

PUCCH$_2$ carrying HARQ-ACK codebook 2

Dropped symbols

UL grant to potentially carry part of the dropped HARQ-ACK codebook

HARQ-ACK CODEBOOK ADAPTATION

CROSS-REFERENCE TO RELATED APPLICATIONS

This application is the National Stage Entry under 35 U.S.C. § 371 of Patent Cooperation Treaty Application No. PCT/US2020/017881, filed Feb. 12, 2020, which claims the benefit of U.S. Provisional Application No. 62/805,023, filed Feb. 13, 2019, the contents of which are incorporated by reference herein.

BACKGROUND

Mobile communications are in continuous evolution and are already at the doorstep of their fifth incarnation—5G.

SUMMARY

Systems, methods, and instrumentalities are disclosed that may be associated with hybrid automatic repeat request acknowledgment (HARQ-ACK) transmissions, e.g., HARQ-ACK codebook adaptations associated with HARQ-ACK transmissions. A device, such as a wireless transmit/receive unit (WTRU), may be configured with multiple physical uplink channels, e.g., physical uplink control channels (PUCCHs), in a slot. Each physical uplink channel may have a respective HARQ-ACK codebook. In examples, the WTRU may determine that a first physical uplink channel and a second physical uplink channel overlap in a slot. In such a case, the WTRU may determine that a first HARQ-ACK codebook associated with the first physical uplink channel has a higher priority than a second HARQ-ACK codebook associated with the second physical uplink channel. The WTRU may transmit the first HARQ-ACK codebook on the first physical uplink channel in the slot. The WTRU may send part of the second HARQ-ACK codebook in the slot and part of the second HARQ-ACK codebook in a subsequent slot (e.g., a next slot, a future slot, etc.). For example, the WTRU may determine a first sub-codebook of the second HARQ-ACK codebook and a second sub-codebook of the second HARQ-ACK codebook. The WTRU may transmit the first sub-codebook of the second HARQ-ACK codebook on the first physical uplink channel in the slot and transmit the second sub-codebook of the second HARQ-ACK codebook (e.g., on the second physical uplink channel) in a subsequent slot. The WTRU may transmit the first sub-codebook of the second HARQ-ACK codebook using a non-overlapping portion of the second physical uplink channel (e.g., a portion/symbol(s) of the second physical uplink channel that do not overlap with the first physical uplink channel in the slot).

A WTRU may, e.g., autonomously, determine to use remaining symbol(s) of a configured PUCCH for a dropped HARQ-ACK codebook transmission based on one or more of the following: remaining symbols available for PUCCH; HARQ-ACK codebook size; or, BLER target/service type associated with the HARQ-ACK codebook.

A WTRU may be configured with a PUCCH resource set specific to dropped HARQ-ACK codebook transmission, where one or more of the following may apply: a PUCCH resource indication within the resource set may depend on the PRI of the dropped HARQ-ACK codebook transmission; or, K1 timing may be associated with timing for transmission and dynamically indicated to the WTRU.

A WTRU may use configured grant/dynamic grant PUSCH for a dropped HARQ-ACK codebook transmission.

The WTRU may autonomously determines which UL grant to be used based on one or more of the following: arrival timing of the grant; or, a beta offset indication.

A WTRU may combine the remaining bits of a dropped HARQ-ACK codebook in the next codebook of the same service type/requirement. This may be based on counter DAI and/or total DAI step size.

DETAILED DESCRIPTION

Figure 1A:
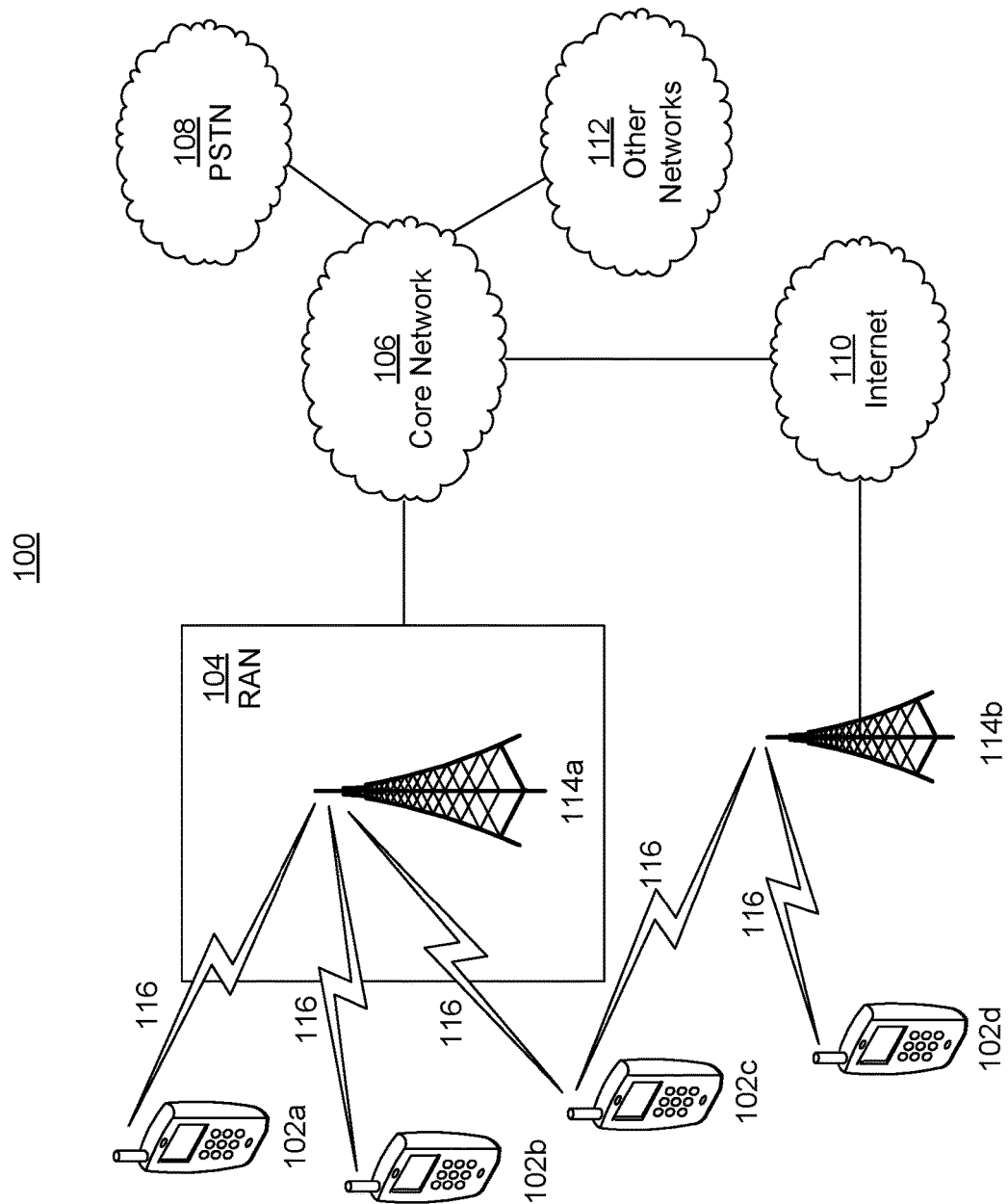
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
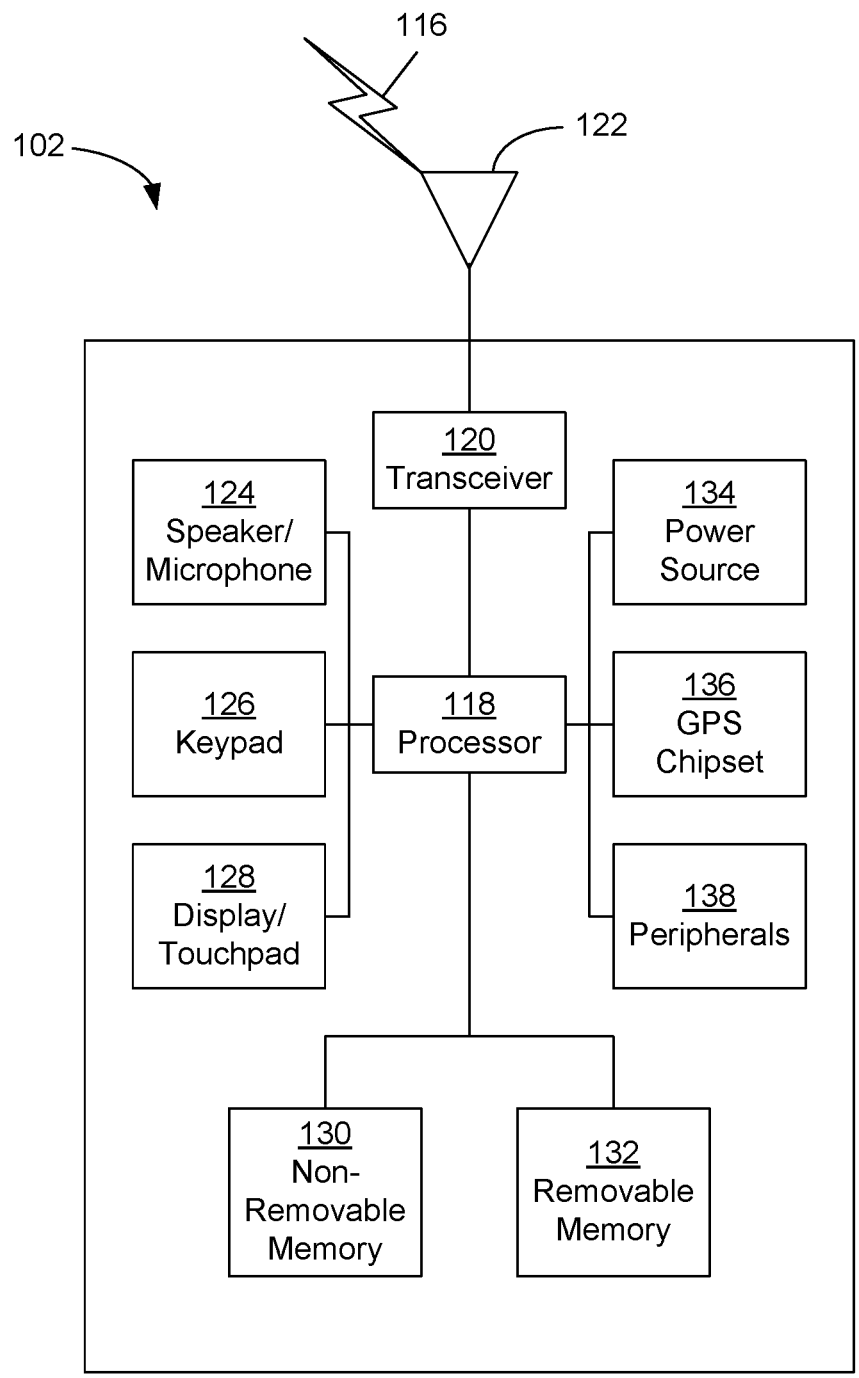
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
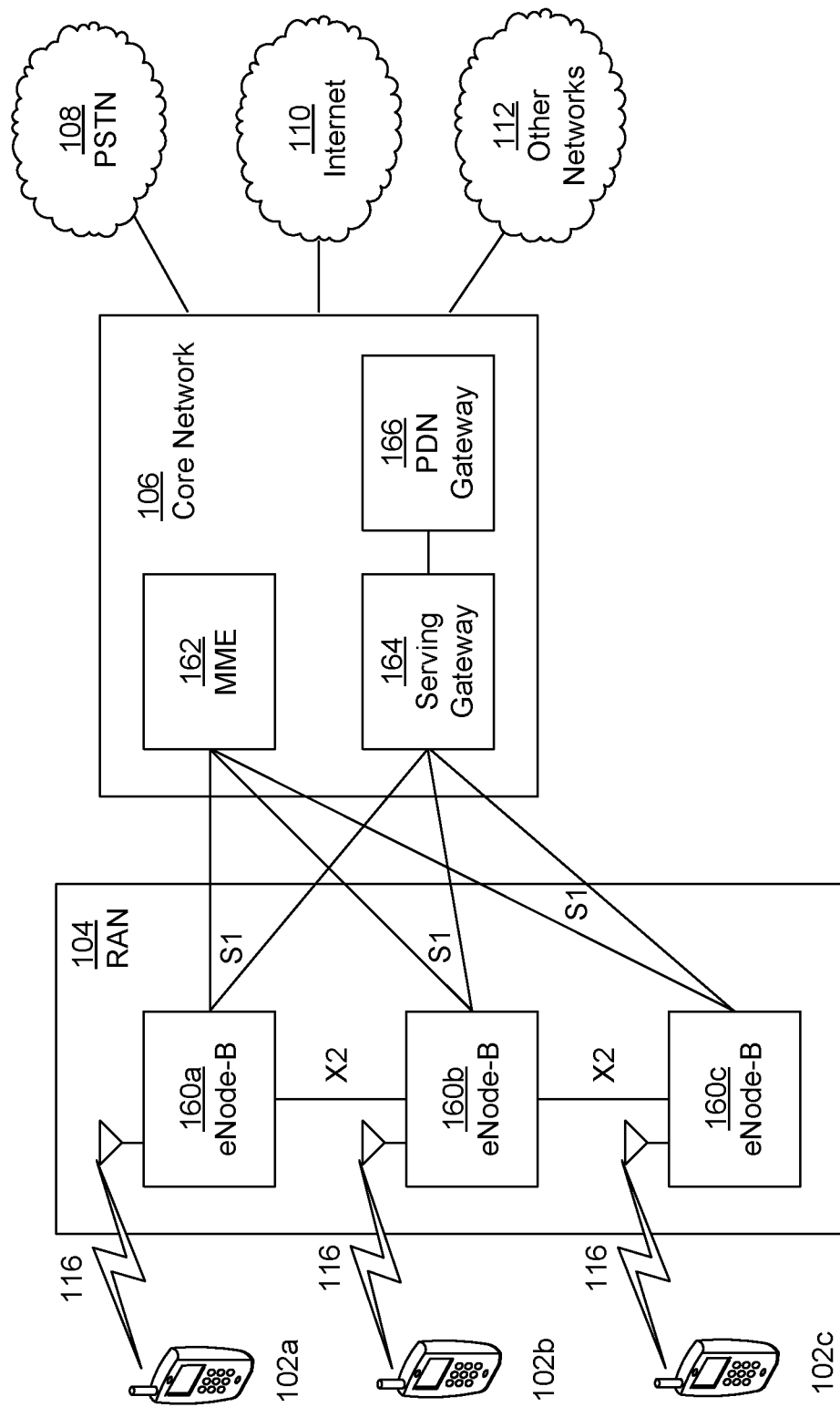
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
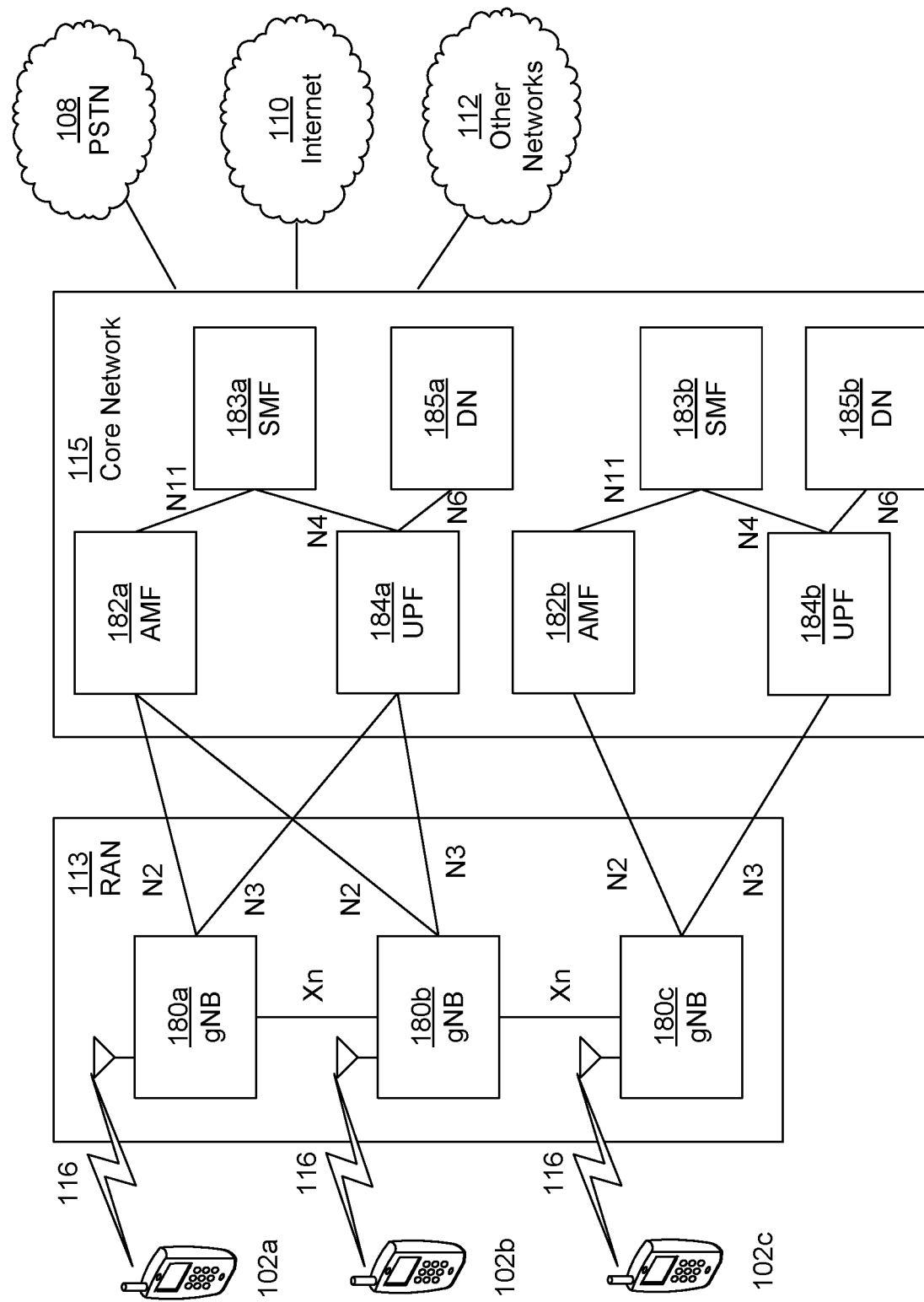
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) technology may be associated with 3GPP. NR may support variable transmission duration/starting symbol and HARQ feedback timing. With variable transmission duration, a PDSCH or PUSCH transmission may occupy a contiguous set of symbols, e.g., within a slot. With variable feedback timing, the DCI scheduling a DL assignment may include an indication of the HARQ feedback timing to a WTRU e.g., by pointing to one of the semi-statically configured HARQ timing. NR may support dynamic HARQ-ACK codebook where the size of a HARQ codebook may depend on the number of scheduled transport blocks (TBs). A gNB may use a counter downlink assignment index (DAI) and total DAI in the DCI to indicate the number of previously scheduled TBs. Counter and total DAI may have a size of 2 bits, e.g., which may allow a WTRU to recover up to 4 missing TBs. In examples, NR Rel-15 may support a WTRU transmitting at most one HARQ-ACK codebook within a slot.

Reliability and/or latency of control signaling may have an impact on data transmission(s) in downlink and uplink. Uplink control information (UCI) with low reliability may increase the decoding error probability of downlink data transmission. For example, HARQ-ACK feedback with high BLER may result in a high probability of NACK-to-ACK or NACK/ACK missed detection. It may be supported that HARQ-ACK codebooks for different types of services can be transmitted separately (e.g., to mitigate the issue), e.g., even in a case where the transmissions is scheduled within the same slot. In examples, a WTRU may drop one of the HARQ-ACK codebook in the case of overlapping transmissions.

Where a WTRU is configured by the gNB to transmit multiple HARQ-ACK codebooks in overlapping symbols (e.g., in a limited power scenario), a WTRU may drop the HARQ-ACK codebook of the type of service that does not require low latency and/or high reliability. For example, a WTRU may support eMBB and URLLC, and at a given slot, the WTRU may be scheduled to transmit two HARQ-ACK codebooks of the different type of services which may be overlapping (e.g., partially or completely) within the slot. The WTRU may drop the eMBB HARQ-ACK codebook and prioritize the URLLC HARQ-ACK codebook. the eMBB ACK/NACK bit(s) may not be available at the gNB. This may trigger unnecessary retransmission(s) of the eMBB packets (e.g., the transport blocks corresponding to the dropped HARQ-ACK codebook). On the WTRU side, how the HARQ-ACK codebook will be constructed given that transmission(s) may be scheduled in the subsequent slot(s) may need to be addressed. One or more features provided herein may be associated with reconstructing/adapting a HARQ-ACK codebook, e.g., in case a dropping occurred.

The term "codebook type" may refer to a HARQ-ACK codebook of the same type of service. For example, in case a WTRU groups the ACK/NACK of eMBB TBs in one HARQ-ACK codebook, it may be called codebook type 1. The ACK/NACK of URLLC TBs in another codebook may be called codebook type2.

There may be cases where multiple HARQ-ACK codebooks are configured for a WTRU. The multiple HARQ-ACK codebooks may correspond to different type of services and/or transmissions with different requirements. For example, for a URLLC type of service a WTRU may be configured to maintain different HARQ-ACK codebooks depending on the BLER target of the transmission. Examples may include the following: URLLC transmissions with BLER target of $10^{-5}$ may be acknowledged in a different HARQ-ACK codebook than URLLC transmissions with BLER target of $10^{-6}$. URLLC transmissions with a latency requirement of 0.5 ms may be acknowledged with a different HARQ codebook than URLLC transmissions with a 1 ms latency requirement; etc.

A dropped HARQ-ACK codebook may be transmitted in a subsequent slot (e.g., a next slot, a future slot, etc.). In examples, this may include feature(s) associated with one or more of the following: transmitting a dropped HARQ-ACK codebook on a PUCCH resource; transmitting a dropped HARQ-ACK codebook using PUSCH transmission; using a HARQ-ACK (e.g., new HARQ-ACK) timing to transmit a dropped HARQ-ACK; or, adapting the HARQ-ACK codebook (e.g., combine the dropped HARQ-ACK codebook with next HARQ-ACK codebook transmission of the same codebook type).

A WTRU may be configured to transmit a dropped HARQ-ACK codebook in a different slot than the slot on which it was scheduled to transmit the HARQ feedback. For example, a WTRU may be configured to transmit a HARQ-ACK codebook in slot n and based on one of the triggers described herein, the WTRU may drop the transmission of the HARQ-ACK codebook. The WTRU may keep the NN bit(s) in its buffer for potential transmission in slot n+k, where k>0.

A WTRU may be configured to transmit a dropped HARQ-ACK codebook on a resource (e.g., a PUCCH resource used as an example). A WTRU may be configured with a specific PUCCH resource set for transmitting the dropped HARQ-ACK codebook(s). Such a PUCCH resource set may be an additional resource set or designated from the resource sets already configured for a WTRU. In examples, a WTRU may determine the PUCCH resource within the PUCCH resource set based on the PUCCH Resource Indicator (PRI) that was scheduled for the dropped HARQ-ACK codebook. A WTRU may use the same PRI to determine the PUCCH resource from the resource set. A WTRU may apply an offset to the PRI to determine the PUCCH resource from the resource set. The applied offset may depend on one or more of the following: PRI of the prioritized HARQ-ACK codebook transmission; or, HARQ-ACK timing of the subsequent attempt to transmit the dropped HARQ-ACK codebook.

Using PRI of the prioritized HARQ-ACK codebook transmission, a WTRU may have received an indication to transmit a first HARQ-ACK codebook with $PRI_1$ and a second HARQ-ACK codebook with $PRI_2$. The WTRU may drop the first codebook and transmit the second codebook. In the subsequent slot(s), a WTRU may transmit the dropped codebook using the PUCCH resource of index $PRI_1+PRI_2$ from the PUCCH resource set configured for dropped codebooks.

Using HARQ-ACK timing of the subsequent attempt to transmit the dropped HARQ-ACK codebook, a WTRU may be configured to transmit the dropped HARQ codebook in N slots after dropping. A WTRU may use an index equal to PRI+F(N), where PRI is the index initial PUCCH resource indicated for the dropped HARQ transmission, and F(.) is a function/mapping/table that associates a HARQ timing to a PUCCH index offset.

A WTRU may be configured to transmit a dropped HARQ-ACK codebook using PUSCH transmission. In examples, a WTRU may use a DCI-based grant to transmit the HARQ-ACK codebook. For example, a WTRU may use the UL grant received in the next slot(s) to transmit the dropped feedback. A WTRU may receive an explicit bitfield in the DCI requesting to transmit the dropped HARQ codebook on PUSCH, or, autonomously determine that the UL grant should be used for HARQ-ACK transmission. The WTRU may be configured with an RRC parameter, e.g., 'betaOffsets,' supporting a value that may be signaled by, e.g., 'Beta_offset indicator,' field in the DCI format 0_1 which may indicate that the WTRU needs to transmit the dropped HARQ codebook on the corresponding PUSCH. A WTRU may determine that the UL grant is for HARQ-ACK codebook transmission based on one or a combination of the following: the timing offset between the dropped HARQ codebook and the UL grant is less than a threshold; or, no scheduling request was sent by the WTRU in a timing window preceding the reception of the grant.

In examples, where the timing offset between the dropped HARQ codebook and the UL grant is less than a threshold, if the UL grant is received after $T_{symbols}$ of dropping the HARQ codebook, a WTRU may transmit the HARQ-ACK codebook using the uplink grant. In examples where no scheduling request was sent by the WTRU in a timing window preceding the reception of the grant, the WTRU may not have sent a scheduling request for an uplink scheduling, and/or its UL buffer is empty.

A WTRU may be configured to transmit the dropped HARQ-ACK codebook using an UL configured grant. A WTRU may receive an indication from the network of which configured grant to use from a set of pre-configured/RRC configured grants to be used for the dropped HARQ-ACK codebook transmission. The indication may be signaled semi-statically or dynamically using for example a DCI. The WTRU may be configured with an RRC parameter, e.g., 'betaOffsets,' indicating one of the reserved index values which is not mapped to a beta offset value for HARQ-ACK or CSI transmission on PUSCH (e.g., not mapped to index value 19-31 in Table 1: RRC configuration of beta offset).

TABLE 1

RRC configuration of beta offset

| $I_{offset,0}^{CSI-1}$ or $I_{offset,1}^{CSI-1}$ <br> $I_{offset,0}^{CSI-2}$ or $I_{offset,1}^{CSI-2}$ | $\beta_{offset}^{CSI-1}$ <br> $\beta_{offset}^{CSI-2}$ |
|---|---|
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 12.625 |
| 17 | 15.875 |
| 18 | 20.000 |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

A WTRU may be configured with HARQ-ACK timing (e.g., new HARQ-ACK timing) to transmit a dropped HARQ-ACK, which may be called for example "HARQ timing-to-new HARQ timing." The granularity of the "HARQ timing-to-new HARQ timing" may be configured in units of slots, sub-slots, or symbols. In examples, a WTRU may be configured, using RRC signaling, e.g., with a mapping between values of PDSCH-to-HARQ timing and HARQ timing-to-new HARQ timing. Based on the PDSCH-to-HARQ timing scheduled initially for the codebook transmission, and after dropping the codebook, a WTRU may determine the timing of the transmission using the configured mapping.

In examples, a WTRU may autonomously determine HARQ-ACK timing (e.g., the new HARQ timing) based on one or a combination of the following: control information related to the dropped transmission; or, control information related to the prioritized transmission.

For control information related to the dropped transmission, one or more of the following may apply. A search space configuration on which the DCI was received (e.g., the DCI scheduling at least one of the TBs related to the dropped HARQ-ACK codebook) may be used. A search space configuration may include one or more of the following: monitoring periodicity and duration; monitoring pattern within a slot; or search space index. A CORESET configuration on which the DCI was received (e.g., the DCI scheduling at least one of the TBs related to the dropped HARQ-ACK codebook) may be used. A CORESET configuration may include one or more of the following: a CORESET index; a CORESET duration; or a BWP associated with the CORESET. HARQ timing of the dropped transmission may be included.

For control information related to the prioritized transmission, one or more of the following may apply. A search space configuration on which the DCI was received (e.g., the DCI scheduling at least one of the TBs related to the prioritized HARQ-ACK codebook) may be used. A search space configuration may include one or more of the following: monitoring periodicity and/or duration; monitoring pattern within a slot; or search space index. A CORESET configuration on which the DCI was received (e.g., the DCI scheduling at least one of the TBs related to the prioritized HARQ-ACK codebook) may be used. A CORESET configuration may include one or more of the following: a CORESET index; a CORESET duration; or a BWP associated with the CORESET. HARQ timing of the prioritized transmission may be included.

A WTRU may adapt a HARQ-ACK codebook. A WTRU may be configured to combine a dropped HARQ-ACK codebook with next HARQ-ACK codebook transmission of a same codebook type. In examples, a WTRU may be configured to identify (e.g., dynamically) the codebook type. A WTRU may (e.g., if it receives a downlink assignment of the same type) use the PUCCH resource indication and the HARQ feedback timing indication to acknowledge the transmissions (e.g., the new transmission(s)) and/or the dropped HARQ-ACK codebook. For example, a WTRU may be configured to determine the codebook type based on a codebook identifier. In slot n, a WTRU dropped a HARQ-ACK codebook with codebook identifier equal to k. In slot n+1, a WTRU may receive a downlink assignment indicating a PUCCH resource and HARQ timing in slot n+4 and using a codebook identifier equal to k. The WTRU may adapt the HARQ-ACK codebook size (e.g., the new HARQ-ACK codebook size) to include the dropped HARQ-ACK codebook in slot n.

In examples, a WTRU may be configured to identify whether the dropped HARQ-ACK codebook may be combined with a next HARQ-ACK codebook or not, e.g., based on DAI and/or counter DAI. A WTRU may be configured to interpret an increased step above a configured threshold in the counter DAI and/or total DAI as an indication to combine a transmission of ACK/NACK (e.g., the new transmission of ACK/NACK) with the dropped HARQ-ACK. For example, the last received counter DAI from a WTRU indicating a value of 1 before HARQ-ACK dropping. In the next assignment after dropping, a WTRU may receive a counter DAI and/or total DAI of value 4. A WTRU may determine then the next HARQ-ACK codebook may contain the dropped HARQ codebook.

Trigger(s) may be used for dropping a HARQ-ACK codebook. A WTRU may be configured to drop a HARQ-ACK codebook scheduled for transmission at a given slot. A WTRU may be configured to drop a HARQ-ACK codebook at a given slot based on one or a combination of the following: the HARQ-ACK codebook is overlapping with another uplink transmission (e.g., which has a higher priority than the HARQ-ACK codebook); or, there is a power limited scenario.

In cases where the HARQ-ACK codebook is overlapping with another uplink transmission (e.g., another HARQ-ACK codebook as an example) which has a higher priority than the HARQ-ACK codebook, the uplink transmission may include another HARQ-ACK codebook with higher priority may be scheduled to be transmitted on PUCCH or PUSCH. In examples of a PUSCH transmission, a WTRU may be configured to transmit a URLLC type of transmission over PUSCH which is overlapping with the HARQ-ACK codebook.

In examples associated with a power limited scenario, a WTRU may be configured with multiple overlapping transmission(s) and/or with a maximum transmit power (Pmax). A WTRU may determine that with its current path loss from gNB, it cannot meet the BLER target for one of the scheduled transmissions.

A WTRU may be configured to determine the priority of a HARQ-ACK codebook based on the type of the service associated with the HARQ-ACK codebook and/or whether the HARQ-ACK codebook was dropped in a previous slot(s) or not. In examples, a WTRU may be configured to associate a priority to a HARQ-ACK codebook depending on, for example, at least the service type of one transport block associated with the HARQ codebook. A WTRU may keep adjusting the priority based on the state of the transmission. For example, after dropping a HARQ-ACK codebook, a WTRU may increase the priority of the dropped HARQ codebook transmission.

Figure 2:
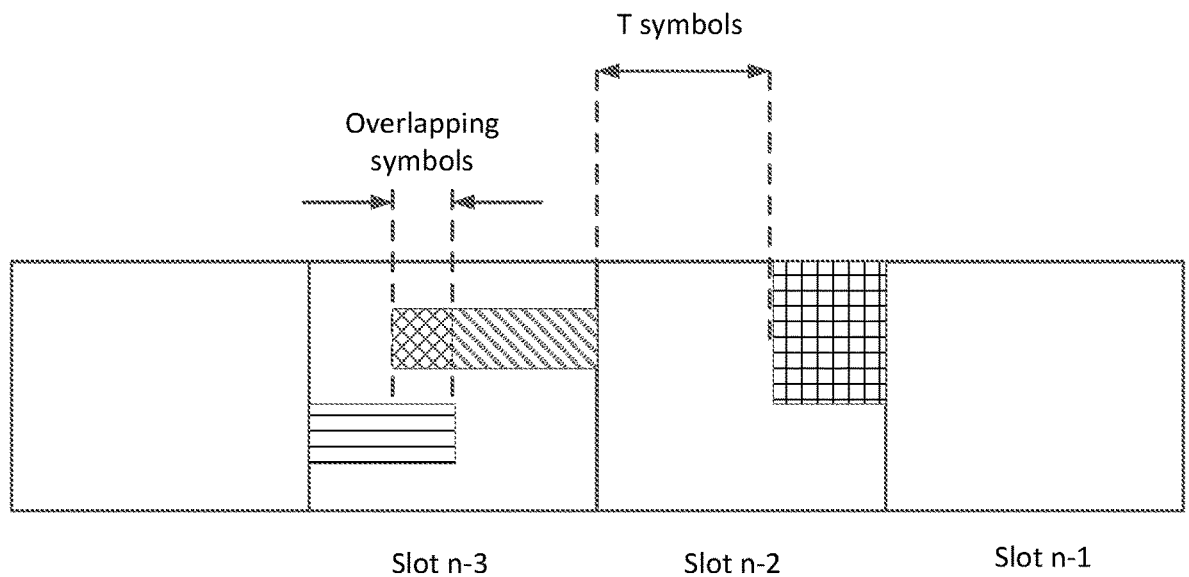
FIG. 2 illustrates overlapping HARQ-ACK codebooks.
Figure 2:
Figure 2:
Figure 2:
Figure 2:
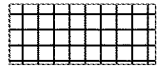
Figure 3:
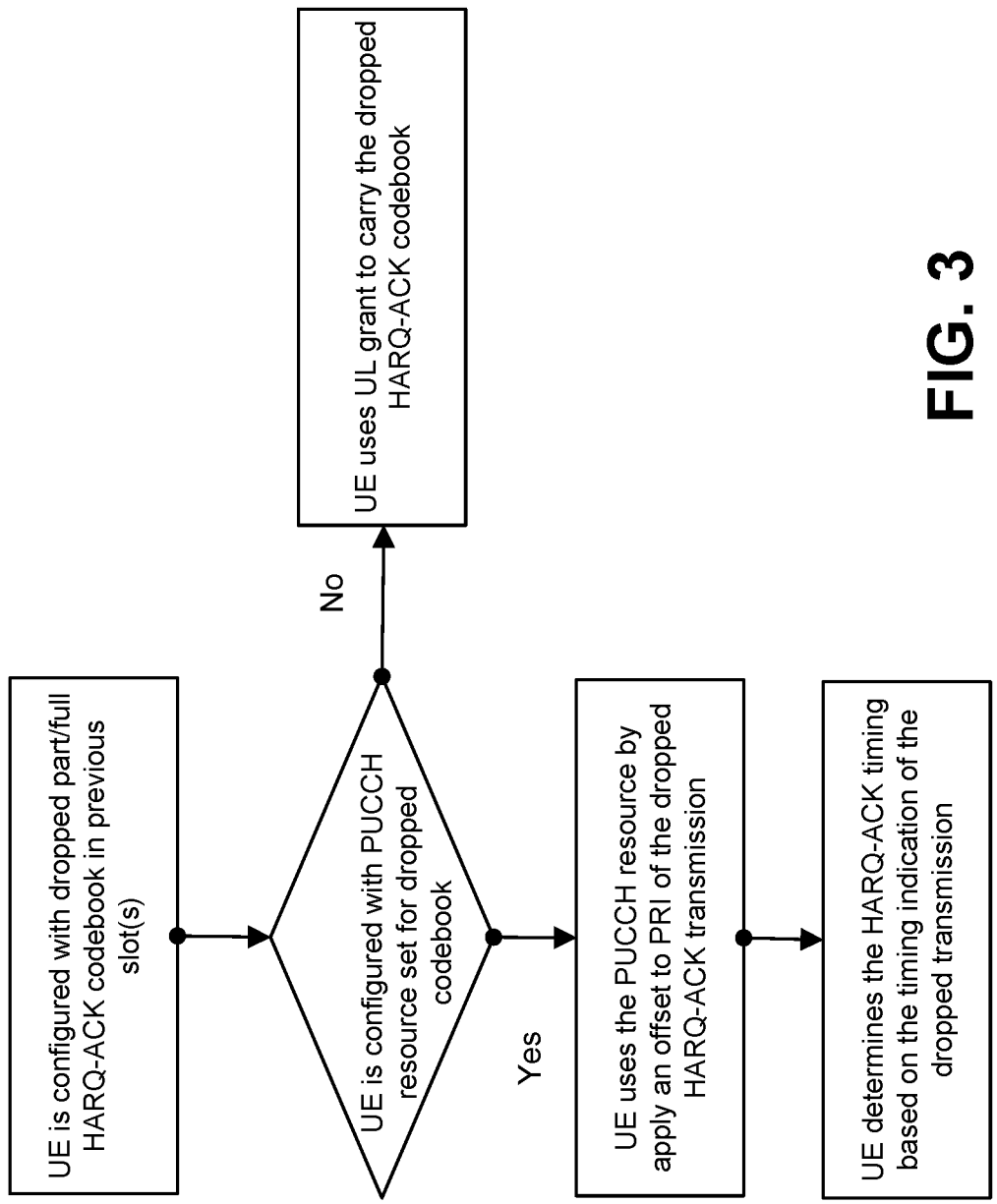
FIG. 3 illustrates an example associated with a WTRU being configured with a PUCCH resource set for a dropped codebook.

FIG. 2 illustrates overlapping HARQ-ACK codebooks in a slot. For example, as shown in FIG. 2, PUCCH1 carrying HARQ-ACK codebook 1 may overlap (e.g., at least partially) with PUCCH2 carrying HARQ-ACK codebook 2. As shown in FIG. 2, a WTRU may be configured with two overlapping HARQ-ACK codebooks in slot n−3. The WTRU may prioritize HARQ-ACK codebook 1, for example, prioritize codebook 1 over codebook 2, e.g., as illustrated in FIGS. 2 and/or 4, and drop the transmission of part of PUCCH 2 that is overlapping with PUCCH1. As shown in FIG. 2, the WTRU may transmit a non-dropped part of PUCCH2 that does not overlap with PUCCH1. The WTRU may determine that the number of remaining symbols of PUCCH2 (e.g., the number of remaining symbols in the portion of PUCCH2 that does not overlap with PUCCH1 as shown in FIG. 2, e.g., the non-overlapping portion of PUCCH2) is above a threshold (e.g., a configured threshold). The WTRU may (e.g., if the WTRU determines that the number of remaining symbols of PUCCH2 is above the threshold) segregate HARQ-ACK codebook 2 into two sub-codebooks, e.g., as shown in FIGS. 2 and/or 4. The WTRU may transmit the first sub-codebook in the non-overlapping portion of PUCCH2, for example using the remaining symbol(s) of PUCCH2 in the slot (e.g., in slot n−3 in the example of FIG. 2). The WTRU may determine that a PUCCH resource set for a dropped HARQ-ACK codebook (e.g. a HARQ-ACK sub-codebook such as the second sub-codebook or a full HARQ-ACK codebook) is, or is not, configured (e.g., for a subsequent slot, such as a next slot, future slot, etc.). The WTRU may decide whether to use an UL grant assignment for the dropped HARQ-ACK codebook transmission, e.g., as shown in FIGS. 2, 3, and/or 4. In slot n−2, the WTRU may receive an UL grant, e.g., starting after $T_{symbols}$ from the end of PUCCH2. The WTRU may determine to transmit the second sub-codebook of HARQ-ACK codebook 2 in accordance with the uplink grant.

FIG. 3 illustrates an example associated with a WTRU being configured with a PUCCH resource set for a dropped codebook. As described in FIG. 3, a WTRU may be configured with a dropped HARQ-ACK codebook (e.g. a HARQ-ACK sub-codebook such as the second sub-codebook of FIG. 2 or a full HARQ-ACK codebook) that was not transmitted in a previous slot. As described in FIG. 3, the WTRU may determine if the WTRU is configured with a PUCCH resource set for the dropped HARQ-ACK codebook. If the WTRU is configured with the PUCCH resource set for the dropped HARQ-ACK codebook, the WTRU may use PUCCH resource(s) from the resource set by applying an offset to a PRI of the dropped HARQ-ACK codebook. The WTRU may determine HARQ-ACK timing based on the timing indication of the dropped transmission. If the WTRU is not configured with the PUCCH resource set for the dropped HARQ-ACK codebook, the WTRU may use an UL grant to carry the dropped HARQ-ACK codebook.

Figure 4:
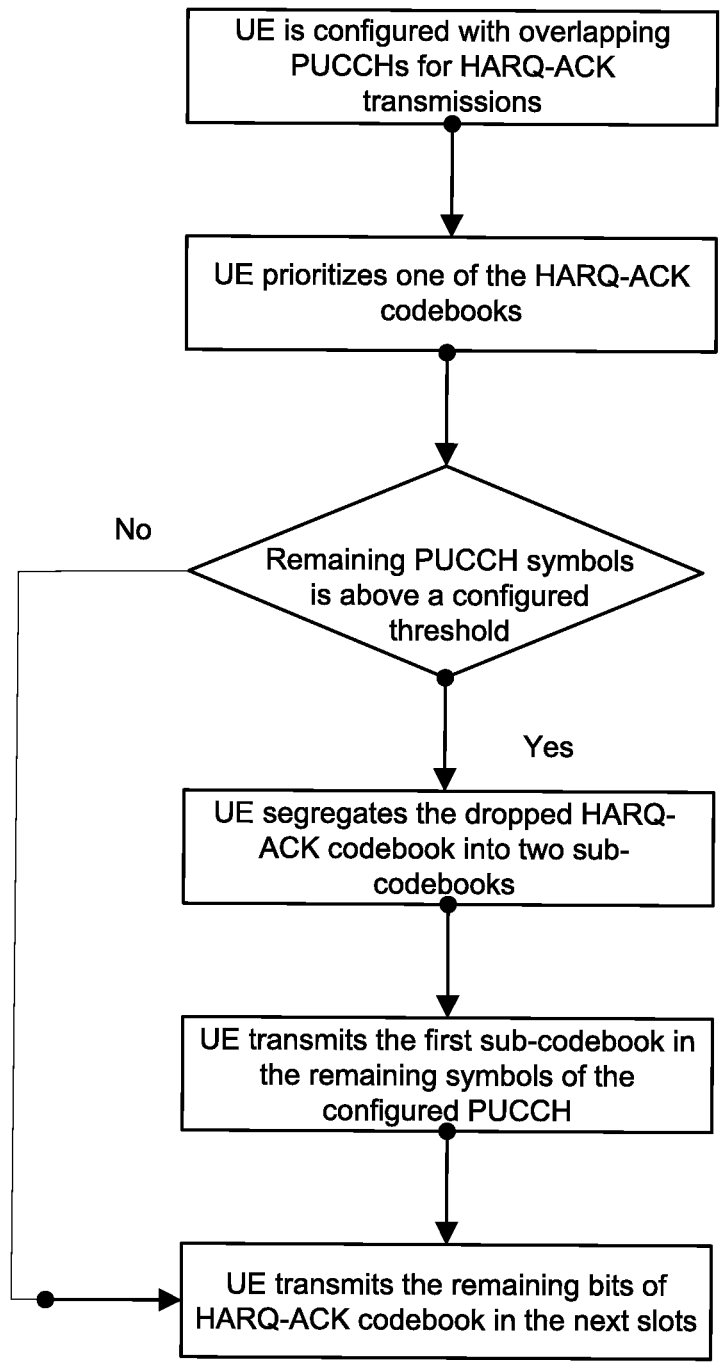
FIG. 4 illustrates an example associated with segregating a dropped HARQ-ACK codebook into sub-codebooks.

FIG. 4 illustrates an example associated with segregating a dropped HARQ-ACK codebook into sub-codebooks. As shown in FIG. 4, a WTRU may be configured with overlapping PUCCHs for respective HARQ-ACK transmissions (e.g., respective HARQ-ACK codebooks). The WTRU may prioritize a HARQ-ACK codebook over another HARQ-ACK codebook(s) (e.g., see FIG. 2). The WTRU may determine whether a remaining amount of PUCCH symbols (e.g., a non-overlapping portion of the PUCCH that was not prioritized, for example as in FIG. 2) is above a threshold (e.g., a configured threshold). If above the threshold, the WTRU may segregate the dropped HARQ-ACK codebook into two sub-codebooks (e.g., FIG. 2). The WTRU may transmit the first sub-codebook in the remaining symbols of the configured PUCCH (e.g., the portion of the configured PUCCH that does not overlap with the prioritized PUCCH, for example as in FIG. 2). The WTRU may transmit the second sub-codebook (e.g., the remaining bits of the dropped HARQ-ACK codebook) in a subsequent slot (e.g., a next slot, a future slot, etc.). If the WTRU determines that the number of PUCCH symbols is below the threshold, the WTRU may transmit the bits of the dropped HARQ-ACK codebook (e.g., full sub-codebook) in a subsequent slot (e.g., a next slot, a future slot, etc.).

A WTRU may be configured to transmit a dropped HARQ-ACK codebook in the slot on which it was scheduled to transmit the HARQ codebook initially. For example, a WTRU may be configured to transmit a HARQ-ACK codebook in a slot n, and based on one of the triggers listed herein, the WTRU may drop the transmission of the HARQ-ACK codebook. The WTRU may transmit the A/N bit(s) in the same slot n, e.g., using the remaining non-overlapping symbols.

There may be triggers for transmitting a dropped HARQ-ACK codebook within a same slot. A WTRU may be configured to determine (e.g., autonomously) whether part of the codebook may be transmitted in the remaining non-overlapping symbol(s) of the PUCCH or not. A WTRU may segregate the HARQ-ACK codebook and may transmit a sub-codebook based on one or more of the following: a number of remaining symbols within the slot; a size of the dropped HARQ-ACK; a type of service associated with the HARQ-ACK codebook; or, a BLER requirement of the HARQ-ACK codebook.

A WTRU may be configured with a number of symbols and if the remaining symbols are above a configured number, the WTRU may transmit a part of the HARQ-ACK codebook (e.g., sub-codebook) within the slot.

A PUCCH resource may be adapted for transmission. Assuming a WTRU is configured with two PUCCH resources for HARQ-ACK information transmission in a slot, if a WTRU detects a first and a second DCI indicating a first and a second resource, respectively, for the PUCCH transmission with corresponding HARQ-ACK information in the slot, the WTRU may transmit the HARQ-ACK information according to one of the following.

Figure 5:
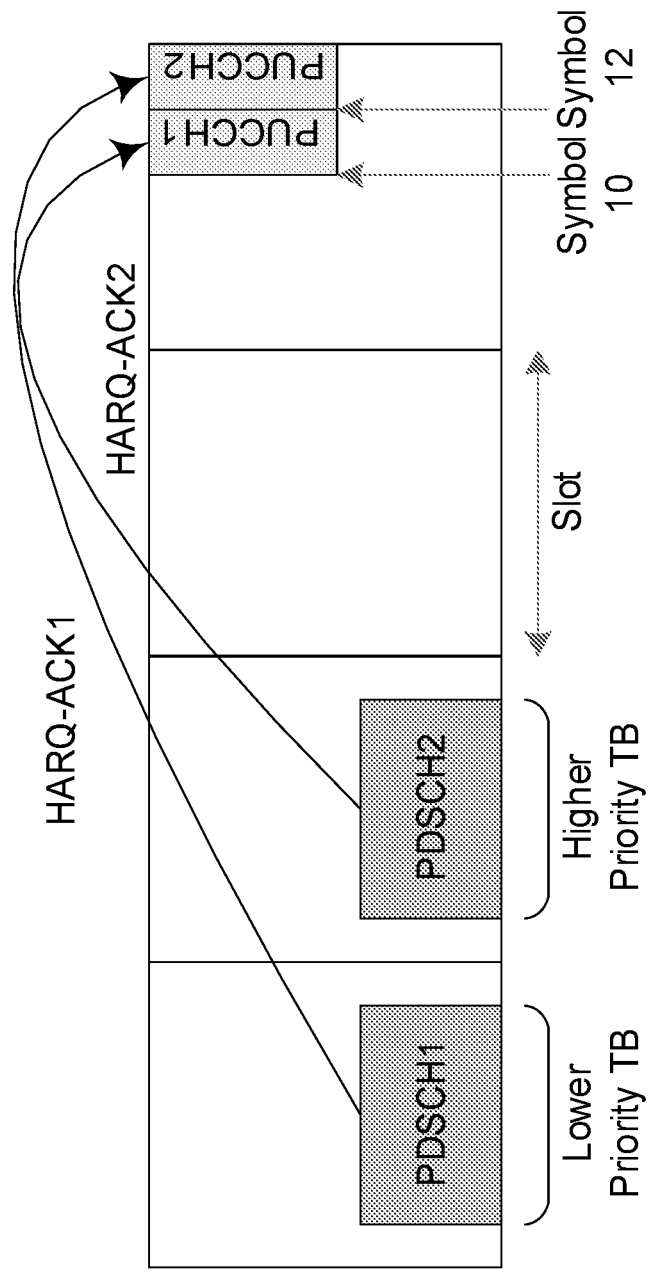
FIG. 5 illustrates HARQ-ACK transmission on multiple PUCCH resources in a slot for two TBs with different priorities.

The WTRU may transmit higher priority HARQ-ACK information in the PUCCH resource with an earlier starting symbol in the slot (e.g., $10^{th}$ symbol) and lower priority HARQ-ACK information in the PUCCH resource with a later starting symbol in the slot (e.g., $12^{th}$ symbol). FIG. 5 illustrates HARQ-ACK transmission on multiple PUCCH resources in a slot for two TBs with different priorities.

Figure 6:
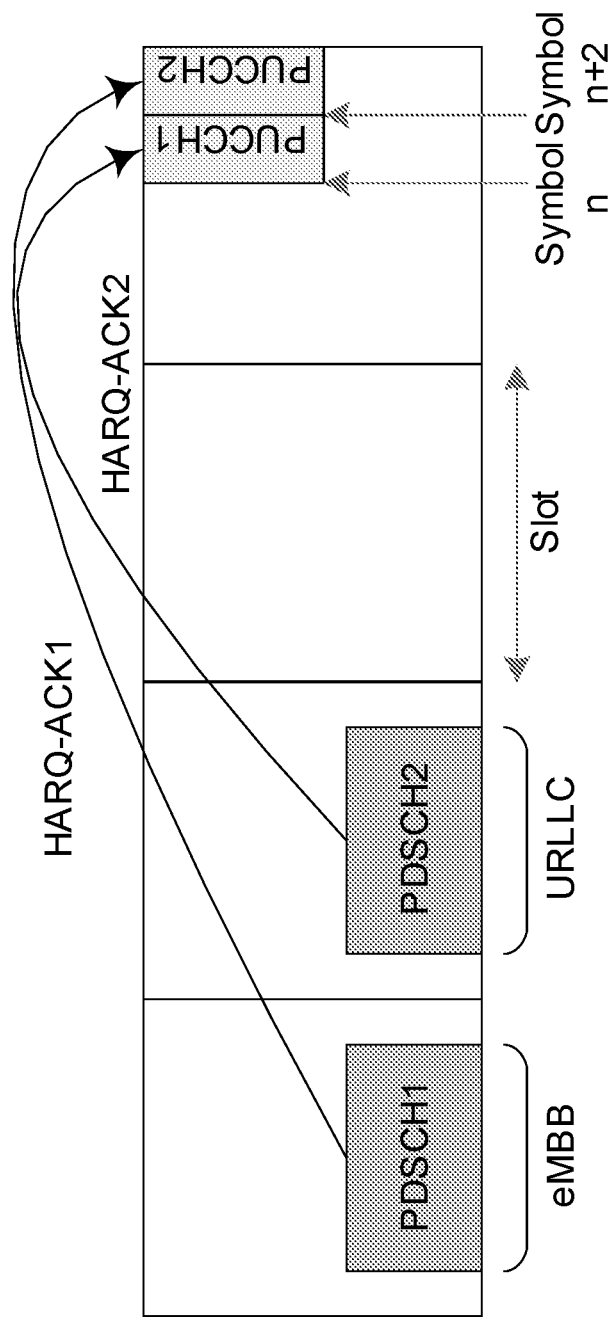
FIG. 6 illustrates HARQ-ACK transmission on multiple PUCCH resources in a slot for two different services.

The WTRU may transmit HARQ-ACK information associated with an URLLC service in the PUCCH resource with an earlier starting symbol in the slot (e.g., $n^{th}$ symbol) and the HARQ-ACK information associated with an eMBB service in the PUCCH resource with a later starting symbol in the slot (e.g., n+2 symbol). FIG. 6 illustrates HARQ-ACK transmission on multiple PUCCH resources in a slot for two different services.

Figure 7:
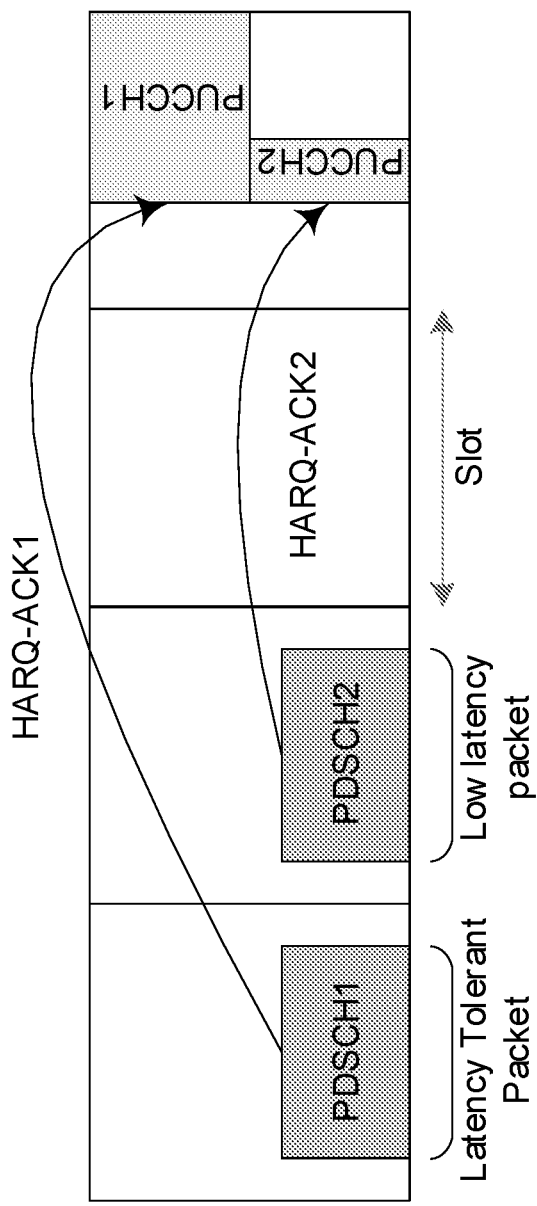
FIG. 7 illustrates HARQ-ACK transmission on multiple PUCCH resources in a slot with different durations.

The WTRU may transmit HARQ-ACK information associated with a low latency transmission in the PUCCH resource corresponding to a PUCCH format with a short duration (e.g., 1-2 symbols) and the HARQ-ACK information associated with a high latency tolerant transmission in the PUCCH resource corresponding to a PUCCH format with a long duration (e.g., 10 or 14 symbols). FIG. 7 illustrates HARQ-ACK transmission on multiple PUCCH resources in a slot with different durations.

If the PUCCH resources have the same PRB offset, starting symbol, and length, the WTRU may determine that the two PUCCH resources have different cyclic shift indices. In this case, the WTRU may apply a rule (e.g., an implicit rule) to establish the association between each received DCI and the corresponding PUCCH resource. The WTRU may assume the PUCCH resource with the lowest cyclic shift index to be used for transmission of the HARQ-ACK information corresponding to an earlier received DCI and the PUCCH resource with the highest cyclic shift index to be used for transmission of the HARQ-ACK information corresponding to a later received DCI.

Figure 8:
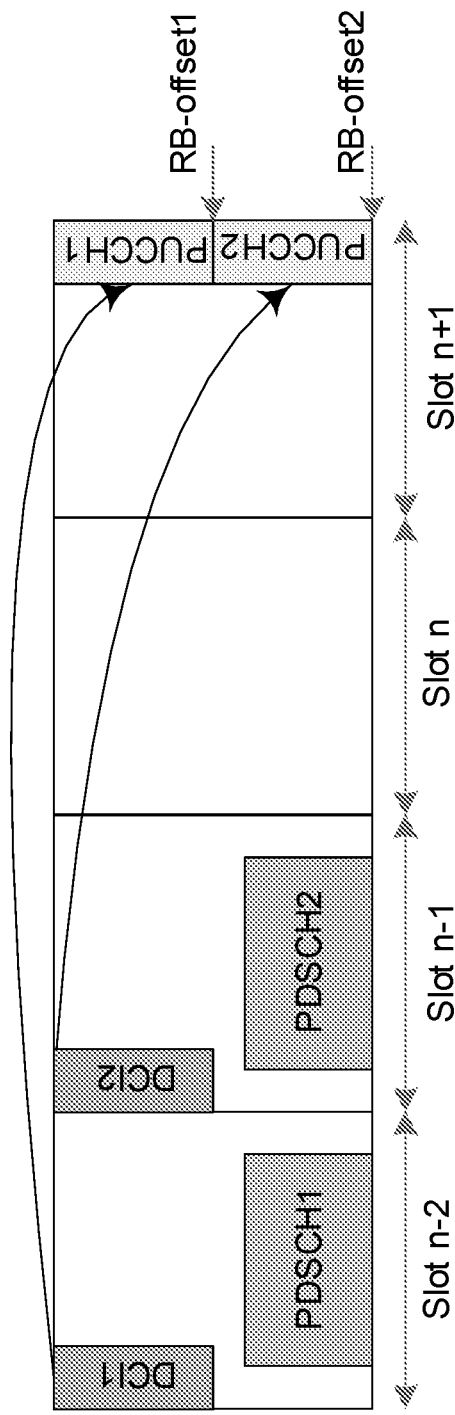
FIG. 8 illustrates HARQ-ACK transmission on multiple PUCCH resources in a slot with different RB offsets.

If the PUCCH resources have the same starting symbol, cyclic shift index, and length, the WTRU may determine that the two PUCCH resources have different PRB offsets. In this case, the WTRU may apply a rule (e.g., an implicit rule) to establish the association between each received DCI and the corresponding PUCCH resource. The WTRU may assume the PUCCH resource with the lowest PRB offset to be used for transmission of the HARQ-ACK information corresponding to an earlier received DCI or PDSCH and the PUCCH resource with the highest PRB offset to be used for transmission of the HARQ-ACK information corresponding to a later received DCI or PDSCH. FIG. 8 illustrates HARQ-ACK transmission on multiple PUCCH resources in a slot with different RB offsets.

A/N bits may be dropped from a HARQ-ACK codebook. A WTRU may adjust the size of a HARQ-ACK codebook to be able to transmit part of the HARQ-ACK codebook in the remaining symbol(s) of a configured PUCCH. A WTRU may segregate the HARQ-ACK codebook and transmit a subset of the A/N bits of the HARQ-ACK codebook (e.g., which may be a first sub-codebook). A WTRU may select a configured number of bits from the most or the least significant bits within the HARQ-ACK codebook. For example, a WTRU may have a HARQ-ACK codebook with $a_1, a_2, \ldots a_N$ ACK/NACK bit(s). Upon dropping the transmission, a WTRU may still have k non-overlapping symbols for PUCCH transmission. The WTRU may transmit part of the HARQ-ACK codebook (e.g., which may be a first sub-codebook) with M bits such that M≤N e.g., $a_1, a_2, \ldots a_M$ or $a_{N-M+1}, a_{N-M+2}, \ldots, a_N$. A WTRU may be configured to determine the number M based on one or more of the following: the number of remaining symbols of the PUCCH overlapping with another uplink transmission; or, the reliability requirement of the HARQ-ACK codebook transmission.

A WTRU may be configured to transmit the remaining bit(s) of the HARQ-ACK codebook in a subsequent slot (e.g., a next slot, a future slot, etc.) as described herein.

If the PUSCH indicated by the DCI is overlapping with one of multiple PUCCH resources for HARQ-ACK transmission in a slot, one or more of the following may apply. The WTRU may transmit the HARQ-ACK(s) on the PUCCH resource that is not overlapped with PUSCH and may ignore other PUCCH resource(s) or the scheduling DCI(s) corresponding to that PUCCH resource(s) which overlaps with PUSCH. The WTRU may multiplex the HARQ-ACKs with the transport block and transmit it on the PUSCH indicated by the DCI and may ignore the PUCCH resources or the scheduling DCIs corresponding to that PUCCH resources. The WTRU may transmit the HARQ-ACK(s) on the PUCCH resource that is in response to a DCI format detection by the WTRU and may ignore other PUCCH resources as well as the PUSCH. If the WTRU is using a configured UL grant for PUSCH transmission, the WTRU may ignore the PUSCH and may transmit HARQ-ACK on one of the PUCCH resources in response to a DCI format detection by the WTRU.

Although the features and elements of the present disclosure may consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in devices described herein.

What is claimed is:

1. A device comprising:
a processor configured to:
determine that a scheduled first physical uplink channel transmission and a second scheduled physical uplink channel transmission overlap in a first slot, wherein the scheduled first physical uplink channel transmission and the scheduled second physical uplink channel transmission are associated with a first hybrid automatic repeat request acknowledgment (HARQ-ACK) codebook and a second HARQ-ACK codebook, respectively;
determine that the first HARQ-ACK codebook has a higher priority than the second HARQ-ACK codebook;
transmit the first HARQ-ACK codebook via the scheduled first physical uplink channel transmission in the first slot;
determine a first sub-codebook of the second HARQ-ACK codebook and a second sub-codebook of the second HARQ-ACK codebook; and
transmit the first sub-codebook of the second HARQ-ACK codebook via the scheduled second physical uplink channel transmission in the first slot, wherein the first sub-codebook of the second HARQ-ACK codebook is transmitted using a non-overlapping portion of the scheduled second physical uplink channel transmission.

2. The device of claim 1, wherein the processor is further configured to transmit the second sub-codebook of the second HARQ-ACK codebook in a second slot.

3. The device of claim 1, wherein the determination that the first HARQ-ACK codebook has the higher priority than the second HARQ-ACK codebook is based on a service type associated with the first HARQ-ACK codebook and a service type associated with the second HARQ-ACK codebook.

4. The device of claim 1, wherein the determination of the first sub-codebook of the second HARQ-ACK codebook and the second sub-codebook of the second HARQ-ACK codebook is based on a number of symbols of the scheduled second physical uplink channel transmission in the first slot that do not overlap the scheduled first physical uplink channel transmission in the first slot.

5. The device of claim 4, wherein the determination of the first sub-codebook of the second HARQ-ACK codebook and the second sub-codebook of the second HARQ-ACK codebook is based on a reliability requirement of the second HARQ-ACK codebook.

6. The device of claim 5, wherein the reliability requirement of the second HARQ-ACK codebook comprises a block error rate target.

7. The device of claim 1, wherein the scheduled first physical uplink channel transmission is a scheduled physical uplink control channel transmission or a scheduled physical uplink shared channel transmission.

8. The device of claim 1, wherein the scheduled first physical uplink channel transmission is one or more scheduled first resources, and wherein the scheduled second physical uplink channel transmission is one or more scheduled second resources.

9. A method comprising:
determining that a scheduled first physical uplink channel transmission and a second scheduled physical uplink channel transmission overlap in a first slot, wherein the scheduled first physical uplink channel transmission and the scheduled second physical uplink channel transmission are associated with a first hybrid automatic repeat request acknowledgment (HARQ-ACK) codebook and a second HARQ-ACK codebook, respectively;
determining that the first HARQ-ACK codebook has a higher priority than the second HARQ-ACK codebook;
transmitting the first HARQ-ACK codebook via the scheduled first physical uplink channel transmission in the first slot;
determining a first sub-codebook of the second HARQ-ACK codebook and a second sub-codebook of the second HARQ-ACK codebook; and
transmitting the first sub-codebook of the second HARQ-ACK codebook via the scheduled second physical uplink channel transmission in the first slot, wherein the first sub-codebook of the second HARQ-ACK codebook is transmitted using a non-overlapping portion of the scheduled second physical uplink channel transmission.

10. The method of claim 9, further comprising transmitting the second sub-codebook of the second HARQ-ACK codebook in a second slot.

11. The method of claim 9, wherein the determination that the first HARQ-ACK codebook has the higher priority than the second HARQ-ACK codebook is based on a service type associated with the first HARQ-ACK codebook and a service type associated with the second HARQ-ACK codebook.

12. The method of claim 9, wherein the determination of the first sub-codebook of the second HARQ-ACK codebook and the second sub-codebook of the second HARQ-ACK codebook is based on a number of symbols of the scheduled second physical uplink channel transmission in the first slot that do not overlap the scheduled first physical uplink channel transmission in the first slot.

13. The method of claim 12, wherein the determination of the first sub-codebook of the second HARQ-ACK codebook and the second sub-codebook of the second HARQ-ACK codebook is based on a reliability requirement of the second HARQ-ACK codebook, and wherein the reliability requirement of the second HARQ-ACK codebook comprises a block error rate target.

14. The method of claim 9, wherein the scheduled first physical uplink channel transmission is a scheduled physical uplink control channel transmission or a scheduled physical uplink shared channel transmission.

15. The method of claim 9, wherein the scheduled first physical uplink channel transmission is one or more scheduled first resources, and wherein the scheduled second physical uplink channel transmission is one or more scheduled second resources.

* * * * *